United States Patent [19]

Reafler

[11] Patent Number: 5,132,148
[45] Date of Patent: Jul. 21, 1992

[54] FLEXIBLE AND STRETCHABLE SHEET MATERIAL USEFUL IN FORMING PROTECTIVE AND DECORATIVE COATINGS

[75] Inventor: Gerald G. Reafler, Rochester, N.Y.

[73] Assignee: Eastman Kodak Company, Rochester, N.Y.

[21] Appl. No.: 649,910

[22] Filed: Feb. 4, 1991

Related U.S. Application Data

[60] Division of Ser. No. 609,050, Nov. 2, 1990, which is a continuation of Ser. No. 116,426, Nov. 3, 1987, abandoned.

[51] Int. Cl.$^5$ .................................................. B05D 3/02
[52] U.S. Cl. .............................. 427/393.5; 427/407.1; 427/412.1; 428/323
[58] Field of Search ............... 427/407.1, 393.5, 412.1; 428/323

[56] References Cited

U.S. PATENT DOCUMENTS

| | | | |
|---|---|---|---|
| 3,769,100 | 9/1958 | Short et al. | 428/31 X |
| 4,368,224 | 1/1983 | Jackson | 428/31 |
| 4,832,991 | 5/1989 | Hayward et al. | 427/407.1 X |
| 4,931,324 | 6/1990 | Ellison et al. | 428/908.8 X |
| 4,971,841 | 11/1990 | Panush et al. | 427/407.1 |

*Primary Examiner*—Michael Lusignan

[57] ABSTRACT

A flexible and stretchable sheet material that is capable of being stretched to conform to a three-dimensional substrate to form a protective and decorative coating thereon is comprised of a thin flexible support having adhered thereto a protective and decorative layer such as a paint layer comprising a colorant incorporated in a film-forming binder. Both the support and the protective and decorative layer are characterized by a very high degree of thickness uniformity and the sheet material exhibits a high level of surface uniformity, an ability to undergo substantial elongation, and a substantially uniform quality and appearance; whereby it can be stretched and bent in the process of bonding it to a substrate and still achieve a defect-free coating of uniformly attractive appearance.

A process for the manufacture of the sheet material comprises the steps of:
  providing a flexible support sheet;
  providing a fluid protective and decorative film-forming composition;
  forming a laminar flow of the composition and directing the flow into contact with the surface of the support to form thereon a protective and decorative layer of substantially uniform thickness; and
  converting the protective and decorative layer to a dry and tack-free state.

In one preferred embodiment, the protective and decorative layer comprises a film-forming binder, a colorant and generally flat light-reflecting particles which are effectively oriented by the laminar flow process to provide a layer characterized by a high degree of geometric metamerism.

20 Claims, 3 Drawing Sheets

FLEXIBLE AND STRETCHABLE SHEET MATERIAL USEFUL IN FORMING PROTECTIVE AND DECORATIVE COATINGS

This is a divisional of copending application Ser. No. 07/609,050 filed on Nov. 2, 1990 which is a continuation of Ser. No. 07/116,426 filed on Nov. 3, 1987 and now abandoned.

FIELD OF THE INVENTION

This invention relates in general to the art of providing protective and decorative coatings of the type most typically applied in industry by spray painting techniques. More specifically, this invention relates to a flexible and stretchable sheet material that can be bonded to various substrates, including exterior automotive panels, to achieve desired protective and decorative effects and thereby reduce or eliminate the need to utilize spray painting processes in the manufacturing operation. The invention also relates to a process for manufacturing such sheet material on an industrial scale.

BACKGROUND OF THE INVENTION

To facilitate an understanding of the many advantages of the invention and to provide for ease of description, the invention will be specifically described hereinafter with reference to providing protective and decorative coatings on exterior automotive panels, but it should be understood that the automobile is only one of many different types of products in whose manufacture the invention can be beneficially applied.

As pointed out in an article by Alan J. Backhouse entitled "Routes To Low Pollution Glamour Metallic Auomotive Finishes", Journal of Coatings Technology, Vol. 54, No. 693, pages 83-90, October 1982, there is a growing need to reduce the amount of atmospheric pollution caused by solvents emitted during industrial paining processes. Many different approaches to meeting this need have been proposed. For example, efforts have been made to replace the solvent-based paints typically used for automobiles with water-based paints. As another alternative, work has been done to facilitate the use of high solids formulations which will result in proportionately less emission of organic solvents. However, the application of automotive finishes is a highly demanding art because of the extremely high quality of the surface finish required and because of the very common application of metallic finishes to provide what Backhouse refers to as "high stylistic effects". Accordingly, past efforts to replace the low viscosity, low-solids-content paint formulations conventionally used in spray painting operations in the automotive industry have met with only very limited success.

A much more promising approach to solving the problem is to eliminate entirely the need for spray painting operations to provide the necessary protective and decorative coating on exterior automotive panels. Elimination of spray painting, or a substantial reduction in the extent of its use, would not only be environmentally beneficial in reducing atmospheric pollution, but would be extremely beneficial from a cost savings standpoint in that spray painting operations are wasteful of the paint to such an extent that more than half of the paint may be lost as waste material. A means for achieving such goal exists through the use of a pre-formed thermoplastic sheet material which can be glued or otherwise securely bonded to the panel to provide the protective and decorative coating. Such techniques are well known and widely used in industry, and have been utilized for such purposes as interior automobile panels as described, for example, in U.S. Pat. No. 3,551,232 issued Dec. 29, 1970. This art is summarized in the aforesaid patent in the following words:

"It is present day conventional practice to make structural members consisting of a relatively rigid substrate to which is bonded as a surface or cover layer a synthetic resin sheet. The surface layer may be smooth or embossed and may be suitably colored to provide a desired decorative effect. The substrate may be formed of a relatively rigid synthetic resin, such as polystyrene, or sheet metal, and the surface layer and the substrate are bonded together to form a laminate. Such structures may be used for a variety of purposes such as interior automobile panels, glove compartment doors, and the like.

A convenient and economical method for making such articles involves the application of a suitable adhesive to the surface of the substrate and then vacuum forming the decorative cover layer over the adhesive layer of the substrate".

The objective of U.S. Pat. No. 3,551,232 is to overcome the problems of bubbling and blistering of the resin sheet that tend to occur in the vacuum-forming process. It achieves this by use of an adhesive containing an inert particulate filler which minimizes the entrapment of air.

To employ a process of the type described in U.S. Pat. No. 3,551,232 with exterior automotive panels presents a much greater challenge. The surface appearance of such panels is of critical importance, so that it is necessary not only to avoid such problems as bubbling or blistering caused by entrapped air, but to provide a protective and decorative coating that will equal or exceed in many respects, the quality of a spray-painted surface and that is equally capable of providing the "high stylistic effects" that are of growing importance in the automotive marketplace. Furthermore, exterior automotive panels present a particular problem in view of the great difficulty of smoothly adhering a flexible sheet material to a substrate which may possess complex curvature and the even greater difficulty of doing so while maintaining over the entire surface of the panel a uniform degree of the color intensity exhibited by the coating.

Heretofore, efforts have been made to produce a flexible and stretchable sheet material having these capabilities through the application of one or more paint layers to the surface of a thermoformable polymeric support. However, such efforts have, prior to this invention, been unsuccessful in that the sheet material has suffered from various defects which have rendered its commercial use impractical. Thus, for example, prior efforts have resulted in products which exhibit numerous coating defects and in which the paint layer does not have the high degree of uniformity which permits the sheet material to undergo the severe stresses of the thermoforming process and yet provide a product which meets the exacting quality standards of an exterior automotive finish.

It is toward the objective of providing a flexible and stretchable sheet material which is capable of being stretched to conform to a three-dimensional substrate, such as an exterior automotive panel, to provide a high quality defect-free protective and decorative coating of uniformly attractive appearance, that the present invention is directed.

SUMMARY OF THE INVENTION

In accordance with this invention, it has been found, most unexpectedly, that a flexible and stretchable sheet material that is (1) capable of meeting the demanding requirements of an exterior automotive finish and (2) capable of withstanding the stretching and bending forces involved in the process of bonding it to exterior automotive panels, can be produced through exacting control of the thickness and thickness uniformity of the support combined with the use of precision coating techniques to provide exacting control of the thickness and thickness uniformity of the coatings. Moreover, as hereinafter described, such coating techniques provide essentially defect-free coatings having a continuous substantially uniform quality and appearance.

The sheet material of this invention comprises a thin flexible support sheet and a protective and decorative layer adhered to one surface of the support sheet. The support has heat-softening and tensile elongation properties which adapt it to use in the thermoforming process and the protective and decorative layer has heat softening and tensile elongation properties that are compatible with those of the support so as to permit symmetrical elongation, whereby the sheet material can undergo substantial elongation by the application of stretching forces without crazing of the protective and decorative layer nor delamination of the protective and decorative layer from the support. The sheet material has a substantially unstressed relaxed state and a relaxed area and is heat softenable to a substantially plastic state in which it is plastically expandable and formable over irregular surfaces to an extended state having an extended area up to at least 50% greater than the relaxed area. The protective and decorative layer has a substantially uniform quality and appearance both in the relaxed and extended states of the sheet material. The sheet material can be stretched to conform to a three-dimensional substrate and bonded thereto to achieve a smooth and wrinkle-free protective and decorative coating of uniformly attractive appearance.

The invention also provides a process for the manufacture of the sheet material comprising the steps of: providing a thin, flexible support sheet; providing a fluid protective and decorative film-forming composition; forming a laminar flow of the composition and directing the flow into contact with the surface of the support to form thereon a protective and decorative layer of substantially uniform thickness; and converting the protective and decorative coating to a dry and tack-free state. The protective and decorative film-forming composition is advantageously coated on the support having thereon an adhesion-promoting tie-layer. The process of this invention provides an essentially defect-free coating with a high degree of uniformity of layer thickness and a substantially uniform quality and appearance.

In a very important embodiment of the invention, the protective and decorative layer is a paint layer comprising a film-forming binder, a colorant and generally flat light-reflecting particles which are effectively oriented by the laminar flow process of this invention, that is, they are preferentially oriented substantially parallel to the surface of the coating. This provides a layer characterized by a high degree of geometric metamerism.

In another important embodiment of the invention, the sheet material includes a topcoat comprising a cross-linked polymer and the support, paint layer and topcoat layer have heat-softening and tensile elongation properties which render the sheet material suitable for use in a thermoforming process and which are mutually compatible so as to permit symmetrical elongation, whereby the sheet material can undergo substantial elongation by the application of stretching forces without crazing or delamination of the paint and topcoat layers, and the support, paint and topcoat layers are of sufficiently uniform character that the sheet material exhibits substantially the same uniformity of appearance before and after the thermoforming process.

In another embodiment of this invention, there is provided a structural element comprising a three-dimensional substrate having securely bonded to at least one surface thereof in a uniform wrinkle-free state a protective and decorative coating formed from the flexible and stretchable sheet material described above.

In a further embodiment of the invention, a method of applying a protective and decorative coating on a three-dimensional substrate includes the steps of heating and stretching the above-described sheet material as it is brought into conforming association with at least one surface of the substrate and securely bonding it to the substrate to form thereon a smooth and wrinkle-free protective and decorative coating.

In yet another embodiment of the invention, there is provided a method of molding a shaped article and simultaneously providing such article with a protective and decorative coating formed from the above-described sheet material on at least one surface thereof.

As explained hereinafter, the sheet material of this invention is adapted for use in a thermoforming process in which it is elongated and is especially advantageous in providing essentially defect-free coatings of continuous substantially uniform quality and appearance both in the relaxed and extended states of the sheet material.

Other advantageous features will become readily apparent upon reference to the following description of the preferred embodiments when read in light of the accompanying drawings.

DESCRIPTION OF THE PREFERRED EMBODIMENTS

Figure 1:
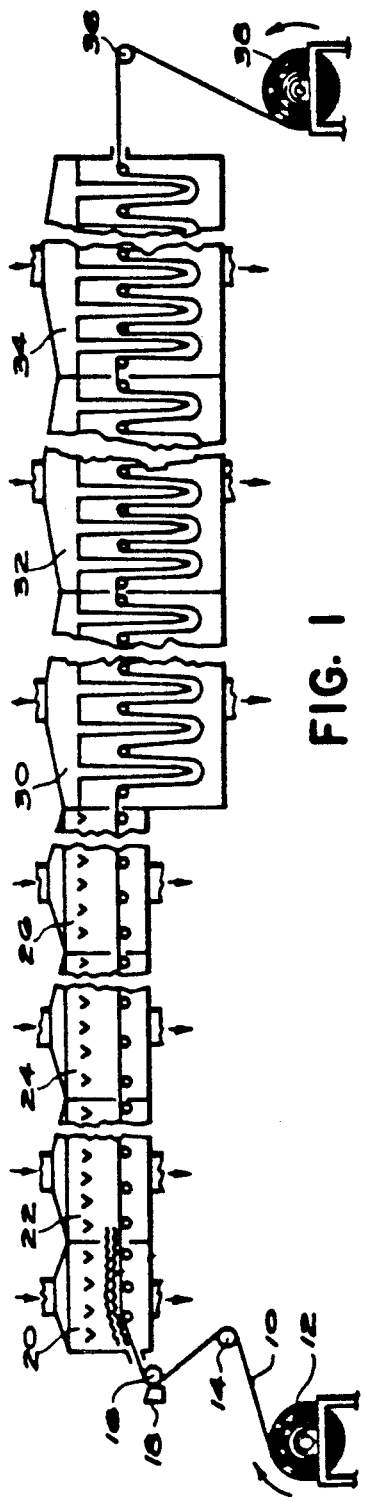
FIG. 1 is a diagrammatic side elevational view of an apparatus usable for manufacturing the sheet material of the present invention.
Figure 2:
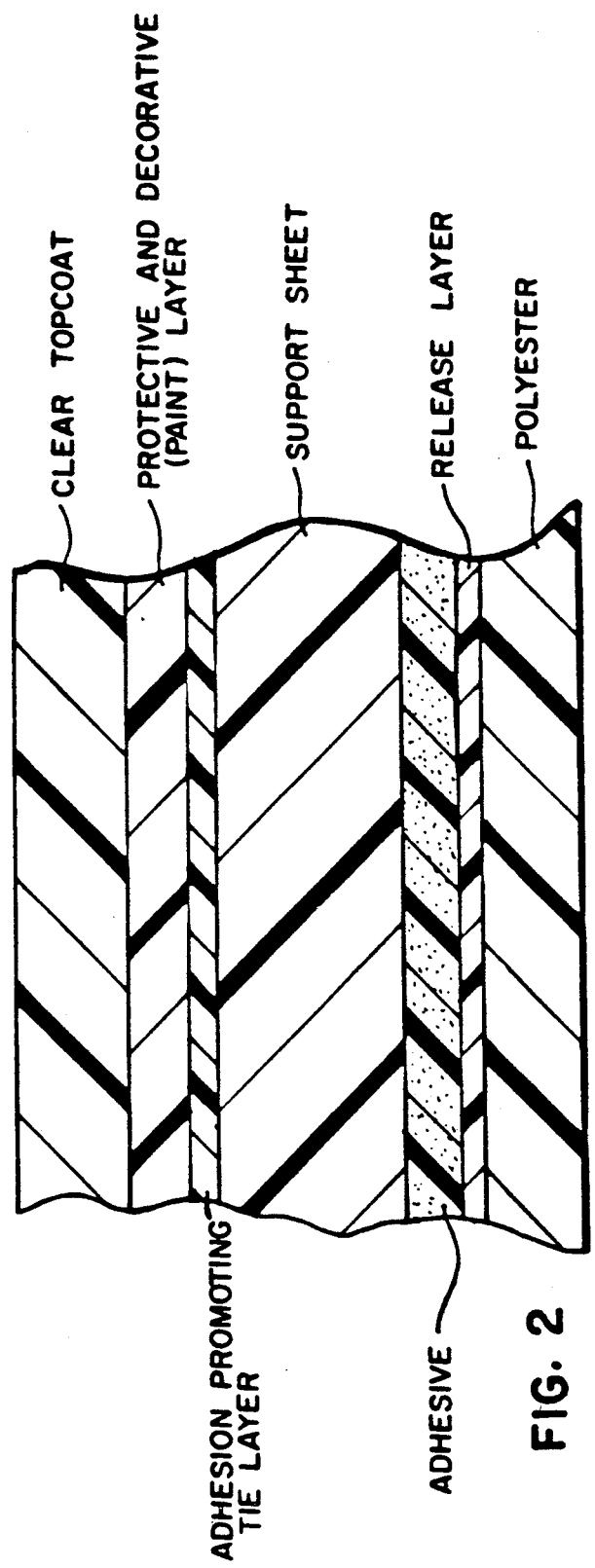
FIG. 2 is an enlarged cross-sectional elevational view of a sheet material manufactured in accordance with the present invention.
Figure 3:
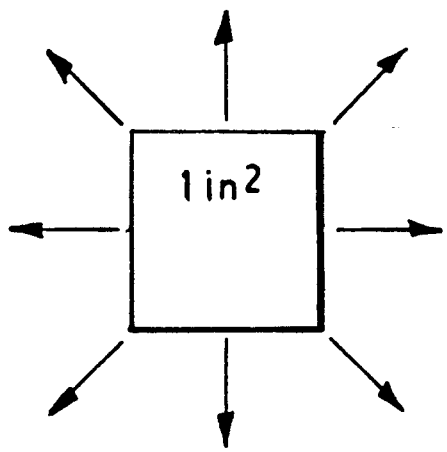
FIG. 3 is a top plan view of a predetermined area of a sheet material constructed in accordance with the present invention.
Figure 4:
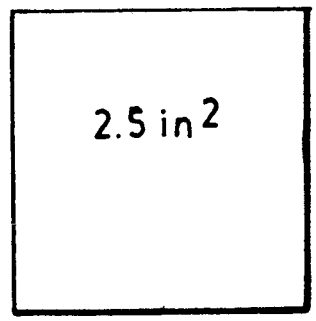
FIG. 4 is a view similar to FIG. 3 after the sheet material has been extended up to 2½ times in area.

In accordance with this invention, it has been unexpectedly discovered that the many difficult problems inherent in fabricating a flexible and stretchable sheet material that is adapted for use in a thermoforming process in which it is stretched to conform to a three-dimensional substrate and bonded thereto so as to form a smooth and wrinkle-free protective and decorative coating exhibiting "high stylistic effects" can be effectively obviated by the sheet material of this invention. Such sheet material has been found, most surprisingly, to produce a finished product with a protective and decorative coating that is free of distortion such as ripples, wrinkles, kink marks, and the like and that exhibits an appearance at least equal in overall quality to that achievable by spray coating.

This invention is based at least partly on the recognition that a flexible and stretchable sheet material can provide a protective and decorative coating on articles of three-dimensional shape that possesses properties at least as good as that achievable by spray painting, while avoiding many of the disadvantages associated with spray painting processes. In a particularly preferred embodiment, the invention is based on the further recognition that such sheet material can meet the exacting demands of the automotive industry for very high quality exterior automotive finishes. Being capable of meeting the stringent demands of the automotive industry, the sheet material of this invention is, of course, also suitable for use in many other less demanding applications and is readily adaptable for use with a very wide variety of substrates, to which it can be attached by an adhesive or by being integrally bonded thereto by techniques such as heat fusion.

The precision coating capability provided by the laminar flow process of this invention permits the formation of a protective and decorative layer which is essentially defect free. Moreover, it enables the exacting control of layer thickness which—coupled with close control of support thickness—permits the manufacture of a flexible sheet material that is capable of meeting both the demands of the vacuum-forming and thermoforming processes and the rigorous demands imposed in meeting industry standards for the appearance and performance of automotive finishes. Close control of the physical properties of the flexible and stretchable sheet material of this invention is the key to its successful utilization. Such properties can be obtained with the use of a very wide diversity of different materials, both in regard to the support and in regard to the protective and decorative layer and optional layers such as a tie-layer, a topcoat layer and an adhesive layer. A detailed description of particularly useful materials for the support and for each of these layers is provided hereinbelow.

The sheet material of this invention comprises a thin flexible support sheet. The support sheet preferably comprises an essentially planar, self-supporting, stretchable, thermoplastic polymeric film. The support can be transparent, translucent or opaque. If desired, it can be matched in color to the color of the protective and decorative layer by incorporation therein of a suitable pigment. This is often beneficial in that a scratch which extends through the light-reflecting layer will be less noticeable if the support is of the same color. The support has a substantially uniform thickness. Preferably, the support has a mean thickness Ts in the range of from about 0.05 to 0.40 millimeters. A preferred mean thickness is in the range of from about 0.16 to 0.32 millimeters. Support thickness is measured by standard thickness tracing techniques known to those skilled in the art. Alternatively, support thickness and thickness deviation can be readily determined from cross-sectional photomicrographs of the sheet material. Support thickness is measured both across the support width and in a direction perpendicular to the width, in a length about equal to the support width. Ts is herein defined as the average of the mean thickness measured in both directions. The maximum support thickness deviation, ts, is herein defined as the maximum thickness minus the minimum thickness of the support from the thickness measurements taken as described above. The support preferably satisfies the relation $ts < 0.20\ Ts$. Accordingly, the support exhibits a high degree of widthwise and lengthwise thickness uniformity. Highly preferred supports have a maximum thickness deviation which satisfies the relation $ts < 0.10\ Ts$. The thickness uniformity of the support contributes to the uniformly attractive defect-free appearance of the sheet material.

Suitable materials for the support sheet include stretchable thermoplastic polymeric films having heat softening and tensile elongation properties which adapt it to use in the thermoforming process. Preferred are those films known to be useful in thermoforming and/or vacuum-forming techniques, such as polyvinyl chloride, polyvinyl acetate, ABS (acrylonitrile-butadiene-styrene) resins, polyethylene and polypropylene. Useful support materials include the polyarylate blends with copolyesters described in U.S. Pat. No. 4,246,381, and the copolyesters derived from aromatic polyesters and glycol polyesters described in U.S. Pat. No. 4,287,325. Blends of rubber-modified styrene-maleic anhydrides with polycarbonates and/or polyesters are also useful, as are blends of poly(ether-esters) and polyesters. Particularly preferred support materials exhibit a tensile elongation at break of at least about 40% when measured in accordance with ASTM D-638. A highly preferred support material is a blend of copolyesters based on poly(1,4-cyclohexylenedimethylene terephthalate) and rubber-modified styrene-maleic anhydride copolymers as described in U.S. Pat. No. 4,582,876. Such support consists of a blend of (a) 70 to 30 weight percent copolyester consisting of repeating units from terephthalic acid, repeating units from 1,4-cyclohexanedimethanol present in the amount of 25 to 90 mole % and repeating units from a second glycol having 2 to 6 carbon atoms present in the amount of 75 to 10 mol %, wherein the total mol % of glycol is equal to 100 mol %, and (b) 30 to 70 weight percent thermoplastic rubber-modified vinyl aromatic polymer compositions comprising (1) from 60 to 93% by weight of a nonequimolar copolymer of 70 to 98% by weight based on a copolymer of a vinyl aromatic monomer and from 2 to 30% by weight based on a copolymer of an unsaturated dicarboxylic acid moiety copolymerizable therewith, and (2) from 7 to 40% by weight of at least two differing rubbery additives which were present during the copolymerization of the monomers of component (1), wherein the rubbery additives comprise from 5 to 20% by weight based on the total composition of at least one high vinyl aromatic conjugated diene copolymer wherein the at least one high conjugated diene-vinyl aromatic copolymer comprises from about 60 to about 93% by weight of the conjugated diene. At least one high vinyl aromatic conjugated diene copolymer preferably is a block copolymer which comprises a greater amount of vinyl aromatic than conjugated diene monomer. The support can include fillers, UV absorbers, plasticizers, colorants, antioxidants, etc. known to be useful in polymeric films.

The sheet material of this invention includes a protective and decorative layer such as a paint layer on one surface of the support. The paint layer, which is also referred to herein as a basecoat layer, preferably comprises a colorant incorporated in a film-forming binder. Conventional colorants used in surface coating compositions can be employed, including inorganic pigments such as titanium dioxide, iron oxide, chromium oxide, lead chromate, carbon black, silica, talc, china clay, metallic oxides, silicates, chromates, etc., and organic pigments, such as phthalocyanine blue, phthalocyanine green, carbazole violet, anthrapyrimidine yellow, flavanthrone yellow, isoindoline yellow, indanthrone blue, quinacridone violet, perylene reds, diazo red and others known to those skilled in the art.

The film-forming binder can comprise any of the film-forming resins conventionally used as binders in basecoat compositions. Particularly useful resinous binders are acrylic polymers, polyesters, including alkyds, and polyurethanes. Examples of such binders and methods for the preparation thereof are described in U.S. Pat. Nos. 4,681,811; 4,403,003 and 4,220,679.

The acrylic polymers are copolymers of one or more alkyl esters of acrylic acid or methacrylic acid optionally together with one or more other polymerizable ethylenically unsaturated monomers. These polymers may be either of the thermoplastic type or thermosetting crosslinking type. Suitable alkyl esters of acrylic acid or methacrylic acid include methyl methacrylate, ethyl methacrylate, butyl methacrylate, ethyl acrylate, butyl acrylate and 2-ethylhexyl acrylate. Suitable other copolymerizable ethylenically unsaturated monomers include vinyl aromatic compounds such as styrene and vinyl toluene; nitriles such as acrylonitrile and methacrylonitrile; vinyl and vinylidene halides such as vinyl chloride and vinylidene fluoride and vinyl esters such as vinyl acetate.

Where the polymer is of the crosslinking type, suitable functional monomers may be used in addition to the other acrylic monomers mentioned above and include, for example, acrylic acid, methacrylic acid, hydroxyethyl acrylate, hydroxyethyl methacrylate, hydroxypropyl acrylate, and hydroxypropyl methacrylate. The coating composition in such cases contains a crosslinking agent such as a condensate of an amine or an amide with formaldehyde such as urea, melamine, or benzoguanamine reacted with formaldehyde or a lower alkyl ether of such condensate in which the alkyl groups contain from 1 to 4 carbon atoms. Other crosslinking agents such as polyisocyanates including blocked polyisocyanates may be also used. Also, the acrylic polymer can be prepared with N-(alkoxymethyl)acrylamides and N-(alkoxymethyl)methacrylamides which result in self-crosslinking acrylic polymers.

The acrylic polymer may be prepared by solution polymerization techniques in the presence of suitable catalysts such as organic peroxides or azo compounds, for example, benzoyl peroxide or N,N'-azobis-(isobutyronitrile). The polymerization can be carried out in an organic solution in which the monomers are soluble. Suitable solvents are aromatic solvents such as xylene and toluene and ketones such as methyl amyl ketone. Alternately, the acrylic polymer may be prepared by aqueous emulsion or dispersion polymerization techniques.

Besides acrylic polymers, the resinous binder for the paint composition may be an alkyd resin or a polyester. Such polymers may be prepared in a known manner by condensation of polyhydric alcohols and polycarboxylic acids. Suitable polyhydric alcohols include ethylene glycol, propylene glycol, butylene glycol, 1,6-hexylene glycol, neopentyl glycol, diethylene glycol, glycerol, trimethylolpropane, and pentaerythritol.

Suitable polycarboxylic acids include succinic acid, adipic acid, azelaic acid, sebacic acid, maleic acid, fumaric acid, phthalic acid, tetrahydrophthalic acid, hexhydrophthalic acid, and trimellitic acid. Besides the polycarboxylic acids mentioned above, functional equivalents of the polycarboxylic acids such as anhydrides where they exist or lower alkyl esters of the polycarboxylic acids such as the methyl esters may be used.

Where it is desired to produce air-drying alkyd resins, suitable drying oil fatty acids may be used and include those derived from linseed oil, soya bean oil, tail oil, dehydrated castor oil or tung oil.

The polyesters and preferably the alkyd resins contain a portion of free hydroxyl and/or carboxyl groups which are available for further crosslinking reaction. Suitable crosslinking agents are the amine or amide-aldehyde condensates or the polyisocyanate curing agents as mentioned above.

Polyurethanes can also be used as the resinous binder of the paint layer. Among the polyurethanes which can be used are polymeric polyols which are prepared by reacting the polyester polyols or acrylic polyols such as those mentioned above with a polyisocyanate such that the OH/NCO equivalent ratio is greater than 1:1 so that free hydroxyl groups are present in the product.

The organic polyisocyanate which is used to prepare the polyurethane polyol can be an aliphatic or an aromatic polyisocyanate or a mixture of the two. Diisocyanates are preferred, although higher polyisocyanates can be used in place of or in combination with diisocyanates.

Examples of suitable aromatic diisocyanates are 4,4'-diphenylmethane diisocyanate and toluene diisocyanate. Examples of suitable aliphatic diisocyanates are straight chain aliphatic diisocyanates such as 1,6-hexamethylene diisocyanate. Also, cycloaliphatic diisocyanates can be employed. Examples include isophorone diisocyanate and 4,4'-methylene-bis-(cyclohexyl isocyanate). Examples of suitable higher polyisocyanates are 1,2,4-benzene triisocyanate and polymethylene polyphenyl isocyanate.

Most of the polymers prepared as described above are organic solvent-based polymers, although acrylic polymers can be prepared via aqueous emulsion polymerization techniques and used as aqueous-based basecoat compositions. Water-based basecoats in color plus-clear compositions are disclosed in U.S. Pat. No. 4,403,003, and the resinous compositions used in preparing these basecoats can be used in the practice of this invention. Also, water-based polyurethanes such as those prepared in accordance with U.S. Pat. No. 4,147,679 can be used as the resinous binder in the paint layer herein.

The resinous binder for the paint layer can also be the resinous binder used in formulating the clear topcoat composition described below.

Preferred paints of those described above have been used on external automobile components of deformable urethanes. Such paints stretch and deform without cracking or delaminating when the urethane is deformed.

The paint layer preferably has a mean thickness Tr in the range of from about 0.012 to 0.080 millimeters. A particularly preferred mean thickness is in the range of from about 0.020 to 0.060 millimeters. The maximum thickness deviation tr of the paint layer preferably satisfies the relation tr<0.15 Tr. More preferably, tr satisfies the relation tr<0.10 Tr. Thickness and thickness deviation of the paint layer can be readily determined from cross-sectional photomicrographs of the sheet material. As noted, the thickness uniformity of both the support and paint layer are believed to be important in providing defect-free coatings of uniformly attractive appearance.

The heat softening and tensile elongation properties of the paint layer must be compatible with those of the support so as to permit symmetrical elongation. By symmetrical elongation it is meant that the sheet material can undergo substantial elongation by the application of stretching forces without splitting or crazing of the paint layer nor delamination of the paint layer from the support. Applicant's inventive sheet material provides outstanding symmetrical elongation, which results in part from the thickness and thickness uniformity of the layers. The ratio of the mean thickness of the paint layer to the mean thickness of the support preferably is in the range of 1.00 to 0.04 and more preferably in the range of 0.50 to 0.08. A particularly preferred ratio is about 0.02. Sheet materials having thickness ratios of about 0.2 prepared as described below have been found to provide substantial symmetrical elongation without splitting, crazing or delamination.

It should be noted that the thermoforming process typically involves stretching in all directions rather than just a longitudinal stretching of the sheet material. Thus, the sheet material is extended in area. Prior to thermoforming, the sheet material can be said to be in a relaxed state in which it is substantially unstressed. By the thermoforming process, it is softened to a substantially plastic state and plastically extended to an extended state. The sheet material of this invention is capable of extension to an extended area up to at least 50% greater than its relaxed area. Moreover, the sheet material of this invention is characterized by having a substantially uniform quality and appearance in both the relaxed and extended states. The preferred sheet material of this invention is capable of extension to an extended area up to at least 100% greater than its relaxed area. Highly preferred sheet material is capable of extension to an extended area up to at least 200% greater than its relaxed area.

As noted, the protective and decorative layer has a substantially uniform quality and appearance both in the relaxed and extended states of the sheet material. This means that in the relaxed state the sheet material is essentially free of coating defects such as lines, dimples, bubbles, streaks, banding, repellencies, colorant agglomerations and the like when visually examined under roomlight, on a light box and in sunlight. Furthermore, this means that the sheet material provides a commercially acceptable finish when applied to exterior automobile panels. Moreover, a given relaxed size of sheet material can be stretched different degrees in different areas, or stretched in some areas and not in other areas and the uniformity of appearance in all areas, including distinctness of image, gloss, optical density, and flop remains substantially the same.

The sheet material of this invention preferably exhibits a distinctness of image (DOI) of at least 80 as measured by ASTM TEST E-430. Such measurements, for example, can be made on a HUNTERLAB MODEL D47R-6 DORIGON GLOSSMETER. Preferred sheet materials of the invention exhibit a DOI of at least 85, and more preferably of at least 90 when measured by this technique. Highly preferred sheet materials exhibit a DOI of at least 95 when measured by this technique.

The sheet material of this invention preferably exhibits a high degree of uniformity of optical density. Preferred sheet materials have a mean optical density of at least 3.0. More preferably, they exhibit a maximum optical density variation of less than 0.3 units from the mean density of the sheet material as measured by an optical microdensitometer trace across the width of the sheet material. Such measurements can be readily obtained by those skilled in the art using conventional equipment, such as a Perkin Elmer PDS Microdensitometer. Optical density is expressed by the formula $D = \text{Log } T$ wherein D is the optical density and T is the light transmittance. Optical density is conventionally used to express the amount of darkening on a photographic film because light differences expressed in density units closely reflect the manner in which the eye sees these differences. Thus, the lighter of two films that differ by 0.3 density units transmits twice as much light as the darker. Highly preferred sheet materials of this invention exhibit a maximum optical density variation of less than 0.2 density units from the mean density of the sheet material.

The sheet material of this invention preferably exhibits a 20° gloss of at least 80 when measured in accordance with ASTM TEST D-2457. Particularly preferred sheet materials of this invention exhibit a 20° gloss of at least 85 and more preferably of at least 90 when measured by this technique.

The sheet material of this invention preferably exhibits an average surface roughness (Ra) of less than 0.4 micron when measured by conventional surface roughness measuring techniques known in the art. For example, Ra can be measured using a scanning type stylus instrument having a skidless probe and a cutoff of about 0.030 in. One such instrument is the Micro-Topographer ® sold by Federal Products Corporation. Particularly preferred sheet materials of this invention exhibit an average surface roughness of less than 0.2 micron and more preferably of less than 0.1 micron.

In a highly preferred embodiment of this invention, as described in more detail hereinafter, the protective and decorative layer includes reflective particles in addition to a colorant and binder. Any particles conventionally employed in paints, particularly those employed in automotive finish paints can be used. Suitable reflective particles include metallic flakes such as aluminum flake, copper flake, bronze flake, copper bronze flake, nickel flake, zinc flake, magnesium flake, silver flake, gold flake, platinum flake and other platelets such as mica, glass, stainless steel, coated mica, coated glass, and aluminum coated polyester film fragments. Mixtures of two or more types of particles can be used.

The present invention also provides a process for the manufacture of the sheet material described above. This process comprises the steps of providing a flexible support sheet, providing a fluid protective and decorative film-forming composition, forming a laminar flow of the composition and directing the flow into contact with the surface of the support to form thereon a protective and decorative layer of substantially uniform thickness and converting the protective and decorative coating to a dry and tack-free state. The fluid protective and decorative composition preferably comprises a film-forming binder and a colorant. In addition to the binder and colorant, the composition can include reflective particles and optionally other materials well known in the art of coatings. These would include surfactants, flow control agents, thixotropic agents, fillers, organic solvents and catalysts.

A variety of coating techniques are useful, such as direct extrusion onto the support by use of an extrusion hopper functioning to apply the coating composition by a bead coating or a stretch-flow coating mechanism, extrusion of the coating composition through a slot with subsequent travel down the slide surface of a slide hopper or subsequent free fall in a curtain coating process, curtain coating processes in which the curtain is generated by the use of an overflow weir, and so forth. The critical aspect of the coating process is its ability to provide a defect-free coating with a very high degree of uniformity of layer thickness. In view of the flexible nature of the support, it can be coated using conventional web transport systems and will, for reasons of economy, typically be coated at web widths of up to two meters or more and web speeds of up to several hundred meters per minute.

The use of precision coating processes in the production of the sheet material—such as for example the use of high precision extrusion hoppers—is a very important aspect of the present invention. In particular, the coating operation must be conducted with exacting control of all critical parameters to ensure the very high degree of thickness uniformity and the freedom from coating defects that characterize the sheet material of this invention. It is only by such control of both thickness uniformity and coating defects, that sheet material can be produced which is capable of undergoing the rigors of the thermoforming process and, at the same time, is capable of yielding a product exhibiting the very high quality demanded of an automotive finish.

Extrusion hoppers are particularly effective devices for use in the process of this invention. Such devices are well-adapted for use with compositions which exhibit the shear-thinning characteristics typical of the paint compositions hereinbefore described. In such hoppers, transverse pressure gradients are minimized and almost all pressure drop across the slot is in the direction of coating. While applicant does not wish to be bound by any theoretical explanation of the manner in which his invention functions, it is believed that such features contribute to the excellent results achieved with an extrusion hopper, especially in the coating of paint compositions containing reflective flakes.

Preferred coating techniques and apparatus useful in the practice of the present invention are used in the manufacture of photographic products and are described in U.S. Pat. Nos. 2,253,060, 2,289,798, 2,681,294, 2,815,307, 2,898,882, 2,901,770, 3,632,374, and 4,051,278.

After coating onto the support, the protective and decorative composition is converted to a dry and tack-free state, for example, by drying by conventional techniques at temperatures of 25–100° C.

The process for manufacturing the sheet material of this invention on an industrial scale can be carried out on apparatus of the type shown in FIG. 1. The support sheet is provided in a continuous web 10 which is unwound from supply roll 12 and passes around guide roller 14 and then over coating roll 16. A take-up section can be provided to facilitate roll transfer. The support sheet is coated at the coating roll with the paint layer as further described herein. After being coated, the support sheet 10 passes through a series of drying chambers 20, 22, 24 and 26 in each of which warm dry air is uniformly impinged on the coated layers to effect drying thereof. The chambers 20, 22, 24 and 26 together define a first drying zone, and since this zone can comprise additional similar chambers to provide a sufficiently long path of travel for web 10, the series of chambers is illustrated as being broken at several places. After passing through the first drying zone, web 10 passes through a second drying zone defined by chambers 30, 32 and 34. Since the second drying zone can comprise additional similar chambers to extend the path of travel of web 10, this series of chambers is also illustrated as being broken at several places. The first drying zone functions to carry out the major portion of the drying of the coated layers, while the second drying zone serves to remove small amounts of residual liquid remaining in the coated layers. As illustrated, the drying chambers in the first drying zone are of a flat-bed design while those in the second drying zone are of a festoon design in order to provide an extended residence time. After leaving the second drying zone, web 10 passes around guide roll 36 and is wound onto take-up roll 38.

While the essential elements of the flexible and stretchable sheet material of this invention are the support and the protective and decorative layer, other optional layers can be included, and will be especially beneficial under particular circumstances. For example, in a preferred embodiment the paint layer is coated on the support having thereon an adhesion-promoting tie-layer which provides improved bonding strength and thereby reduces the risk of delamination. Suitable tie-layers can be formed from compositions comprising an adhesion promoting species and optionally a suitable solvent. Useful adhesion promoting species include polymers derived from acrylonitrile, vinylidene chloride, and acrylic acid; polymers derived from methylacrylate, vinylidene chloride and itaconic acid; cellulose nitrate, and a variety of commercially available adhesion promoting species, for example, those known under the trade designations FORMVAR 7/95, FORMVAR 15/95, BUTVAR B-98 and BUTVAR B-72, sold by Monsanto, MOBAY M-50 sold by Mobay, VINAC B-15 sold by Air Products, ELVACITE sold by DuPont, and LEXAN sold by General Electric. Suitable solvents include methylethyl ketone, methylene chloride, tetrahydrofuran, toluene, methyl cellosolve, methanol, ethanol, propanol, butanol, mixtures thereof and the like. The adhesion promoting layer preferably has a thickness not greater than about 0.0025 millimeter. The thickness preferably is substantially less than the thickness of the decorative and protective layer. For example, the protective and decorative layer preferably has a thickness at least 8 times the thickness of the adhesion promoting layer.

As noted, a particularly important use for the sheet material relates to its application to exterior automotive panels, whereby the need for spray painting in the manufacture of automobiles can be reduced or eliminated. The sheet material including a substantially clear layer, also referred to herein as a topcoat, adhered to the protective and decorative layer is particularly useful in providing high quality exterior automotive finishes. A topcoat can be incorporated at the outermost layer of the sheet material of this invention. The topcoat and protective and decorative layer can comprise separate strata or a single stratum. The topcoat can provide such desired properties as improved smoothness, high gloss, hardness, durability, resistance to weathering, abrasion resistance, resistance to scratching, chipping and marring, and resistance to spot damage caused by acid rain or pollution.

Topcoat compositions for use with basecoat compositions are well known in the art. They are generally transparent and can comprise crosslinkable polyols such as polyester polyols, polyurethane polyols and acrylic polyols, and polyisocyanate curing agents. In accordance with a preferred embodiment of this invention, the clear layer composition is extruded through a slot onto the paint layer of the sheet material. This advantageously results in improved smoothness, excellent gloss and distinctness of image, compared to topcoats applied by conventional spraying techniques. The clear layer is then converted to a dry and tack-free state, for example by drying by conventional drying techniques at temperatures of 25-100° C.

Alternatively, the topcoat and basecoat compositions can be coated as a unitary stratum from one coating composition, or can be coated simultaneously using known techniques, for example, those described in U.S. Pat. Nos. 2,761,791, 2,941,898, 3,206,323, 3,425,857, 3,508,947, 3,645,773 and 4,001,024. Furthermore, it is possible to lay down two or more layers, for example by multiple layer extrusion, of a multi-layer sheet material before drying, instead of drying each layer individually before laying down the next layer.

In a particularly preferred embodiment of the invention the support, basecoat layer and topcoat layer have heat softening and tensile elongation properties which render the sheet material suitable for use in the thermoforming process and which are mutually compatible so as to permit symmetrical elongation, whereby the sheet material can undergo substantial elongation by the application of stretching forces without crazing or delamination of the basecoat and topcoat layers. The support, basecoat layer and topcoat layer preferably are of sufficiently uniform character that the sheet material exhibits substantially the same uniformity of appearance before and after the thermoforming process.

The elongation properties of the topcoat must be compatible with those of the sheet material in the thermoforming process. The sheet material including the clear layer must be able to undergo substantial elongation by the application of stretching forces without splitting of the topcoat nor delamination of the topcoat from the adjacent layer. Furthermore, the topcoat preferably is formulated to minimize adverse effects on appearance, i.e., gloss, which can occur upon application of the stretching forces. The appearance, gloss, durability and resistance to weathering of the topcoated protective and decorative coatings of the present invention can at least equal or exceed that achieved with a spray painting process.

The present invention has the advantage that basecoat and topcoat paints conventionally used as automotive finishes are made available in the form of a preformed sheet material which is thermoformable and which can be permanently bonded to exterior parts of automobiles, such as fenders or doors, to provide a protective coating having properties at least as good as those attainable by the costly, laborious and wasteful process of spray painting that has heretofore been used in applying such coatings. The invention has the further advantage of enhanced capability to provide the "high stylistic effects" that are achievable with metallic paint layers characterized by great "depth" and a high degree of geometric metamerism. Another advantage of the present invention is that it provides the flexibility for rapid color changes in the process of manufacturing the sheet material and in the process of applying the material to automobile parts. A further advantage of this invention is the ability to control color uniformity which is particularly desirable when colors have to be matched. Furthermore, the invention can provide, if desired, multi-tone and/or multi-color sheet materials, and sheet materials having a controlled textured surface.

Paint compositions comprising metallic particles and colorants are known to provide an overall aesthetically pleasing impression on the viewer and thus are useful in providing decorative coatings, particularly upon the surface of automobile bodies. Such coatings accentuate the styling lines and contoured surface and are characterized by what is known as geometric metamerism. Geometric metamerism, also referred to as goniochromatism or "flop", is the ability of a paint film to exhibit subtle variations in color and appearance depending upon directions from which it is viewed. This effect is produced by metal flakes incorporated into the film at varying depths. Light traveling through the film is reflected by the flakes to a viewer. For a paint film also containing a colorant, the degree of color or hue depends upon the distance traveled by the light through the film such that a viewer perceives a combination of light rays having different degrees of color. Further, the distance traveled by light rays reflected off the flakes depends upon the angle of incidence and angle of reflection. Light traveling normal to the flake surface travels a shorter distance than light traveling at acute angles. The combination of these phenomena makes a film having geometric metamerism appear to be brighter and have a lighter hue when viewed normal to its surface than when viewed at an acute angle. Thus, a viewer looking directly down upon the film surface observes a light, bright color. Flakes near the film surface reflect light that only slightly interacts with the colorant and so appear to sparkle. When the viewer shifts to look at the film at an acute angle to its surface, a darker, more intense color is perceived. Because of the greater degree of interaction, less sparkling is observed and the film appears generally deeper or thicker. At angles approaching the plane of the film surface, multiple reflections between metal flakes dramatically increase the light-colorant interaction making the film appear extremely dark and deep.

The spray coating process is conventionally utilized as a means of orienting reflective flakes to provide protective coatings exhibiting a high degree of geometric metamerism. However, this process suffers from serious disadvantages. It requires the use of compositions which have a low viscosity which is achieved by the use of a high percentage of solvent. The low viscosity low solids formulations are highly disadvantageous because of the need to remove large quantities of organic solvents in the drying operation. As a consequence, a prolonged drying step is necessary to remove the solvent. It would be very desirable to form protective coatings exhibiting a high degree of geometric metamerism from high viscosity compositions that contain relatively low percentages of solvent and, accordingly, could be quickly dried. However, such a high viscosity coating composition would not be amenable to spraying. Moreover, in the low viscosity compositions that are conventionally spray coated, the orientation takes place during the drying step as a result of leveling and shrinkage forces. Effective operation of these forces would be severly inhibited by the use of high viscosity compositions.

A particularly advantageous feature of the present invention is that it is no way dependent on the use of low viscosity low solids formulations, but can readily accommodate the use of high viscosity high solids compositions and even permit the elimination of solvents entirely through the use of radiation-curable coating compositions which are totally convertible to a solid form. Further, reflective particles which are too large to be incorporated in sprayable paint compositions can be readily coated by the method of this invention. Furthermore, control of solvent emission problems is made much easier by the ability to coat aqueous or mixed aqueous/organic systems rather than organic systems, by the ability to coat very high solids compositions, by the ability to eliminate solvent emission entirely through the use of radiation-curable formulations that are fully convertible to a solid form, and by the inherently much greater simplicity in controlling solvent emissions in a web coating operation as contrasted with a spray painting operation.

Figure 5:
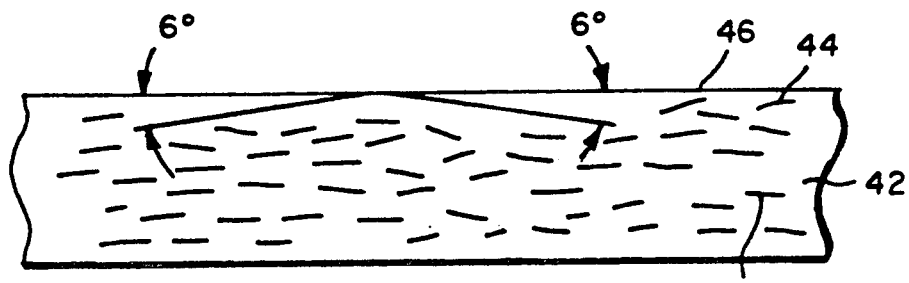
FIG. 5 is a partial cross-sectional view of a coating containing light reflecting particles that have been oriented in accordance with the present invention.
Figure 6:
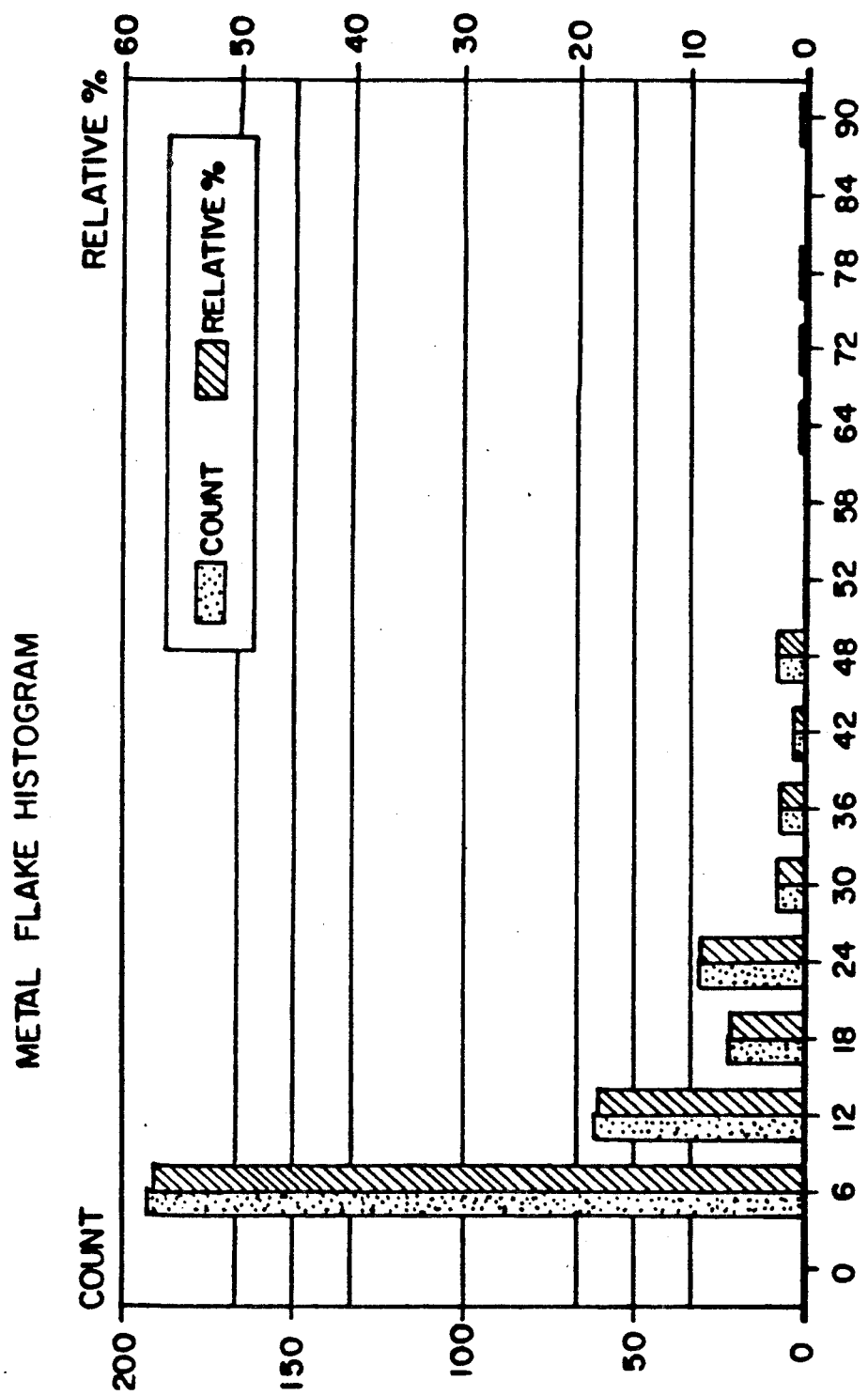
FIG. 6 is a metal particle histogram illustrating relative orientations for particles oriented in accordance with the present invention.

Moreover, the present invention can provide a sheet material having an extremely high degree of geometric metamerism which is surprising and unexpected. The reason for this is not completely understood at this time. It is believed that this superior effect is due at least partly to the high concentration and degree of uniformity of distribution of the colorant and light-reflecting particles in the protective and decorative layer, which uniformity is superior to that achieved with conventional spraying techniques. Further, the light-reflecting particles exhibit orientations substantially parallel to the outer surface of the protective and decorative layer. For example, as illustrated in FIG. 5, protective and decorative layer 42 preferably contains generally flat particles 44 comprised of a light-reflecting material such as mica or a metal. The particles have a preferred orientation with their flat faces within 0-12 degrees of parallelism with outer surface 46. At least 75%, more preferably 80%, of the flakes are in the preferred orientation with substantially none of the particles having an orientation greater than about 50°. This is illustrated by the metal flake histogram of FIG. 6. The uniformity of particle angle orientation attained is also surprising and unexpected to those skilled in the art, particularly in view of the thickness of the layers involved.

The present invention provides many additional important benefits in the field of automotive finishes. For example, the same sheet material can be used to form decorative and protective coatings on both rigid metal parts and flexible plastic parts of an automobile and accordingly, by use of the identical material for both types of parts, can eliminate problems of color matching. This is much more difficult to do with spray painting, since paints which are suitable for application to rigid metal parts are generally not suitable for application to flexible plastic parts so that two different types of paint have to be used.

Furthermore, the present invention is capable of widespread application in many other industrial manufacturing operations—wherever it is desired to provide protective and decorative coatings of very high quality. For example, the sheet material of this invention finds particular utility in products such as office equipment, household appliances, automobile bumpers, auto interior and trim parts, and camera and apparatus housings.

The sheet material described above can be bonded to various three-dimensional substrates through use of well known vacuum-forming and thermoforming techniques to provide a structural element in accordance with this invention. The sheet material provides a uniform wrinkle-free protective coating which has an appearance at least as good as or better than that which is achieved by conventional spray painting techniques.

Thus, in accordance with the invention there is provided a method of applying a protective and decorative coating on a three-dimensional substrate, which method comprises the steps of (1) providing a three-dimensional substrate to which a protective and decorative coating is to be applied; (2) providing the flexible and stretchable sheet material described above; and (3) simultaneously heating and stretching the sheet material as it is brought into conforming association with at least one surface of said substrate and securely bonding it to said substrate to form thereon a smooth and wrinkle-free protective and decorative coating.

The substrate can be rigid or deformable. Rigid substrates include substrates composed of sheet metal, synthetic resins, etc. Elements comprised of such substrates find particular utility as components of an automobile body. Deformable substrates include substrates subject to impacts. One such use is for impact-absorbing bumpers used in automobiles.

In a method of this invention, the sheet material is made soft and flowable by application of heat and is then brought into conforming contact with the article to be coated and is securely bonded thereto. For example, the sheet material can be heated to a temperature within about 25° C. of the glass transition temperature of the support. Such bonding can be effected by the use of well known adhesive bonding techniques using any of a wide variety of suitable adhesive compositions. The adhesive can be provided by known means on the side of the support opposite to the protective and decorative layer. The adhesive facilitates bonding of the sheet material to the substrate. In instances where an adhesive backcoat is applied, the web is interwound with a release sheet to permit it to be wound on a core. Suitable adhesives include acrylic resins and known shrink wrap adhesives. A suitable release sheet comprises a thin polyester film having a silicone release layer thereon.

This invention also provides a method of molding a shaped article and simultaneously providing such article with a protective and decorative coating which method comprises the steps of providing a mold in the configuration of the shaped article; positioning within the mold the above-described flexible and stretchable sheet material, injecting into the mold a fluid composition which is capable of hardening to both form the desired shaped article and bond to the sheet material; and removing from the mold a shaped article having a protective and decorative coating formed from the sheet material securely bonded thereto. For example, the sheet material can be integrally bonded to a molded elastomeric article. In this instance, the sheet material is placed in a mold cavity, and an elastomeric molding compound, such as a urethane rubber, is injected into the mold cavity under pressure against the side of the support opposite the light-reflecting layer to stretch the sheet material so it conforms to the shape of the molded article and bonds to the outer surface of the article. Suitable molds, hardenable fluid compositions and molding process parameters for this method are well-known and form no part of the present invention.

The sheet material of this invention preferably has a heat deformation temperature or softening point that is sufficiently low that it can be thermoformed at temperatures that do not adversely affect the properties of the protective and decorative layer or other layers. On the other hand, when a crosslinkable clear topcoat layer that is cured by application of heat is employed, the softening point of the sheet material should be sufficiently high as to permit such curing without adversely affecting the physical properties of the sheet material. Thus, in some instances, there may be only a relatively narrow operating window between the temperature at which the sheet material is cured, and the higher temperature at which it is thermoformed. The softening point of the sheet material must, of course, also be sufficiently high to resist the temperatures which the end product encounters in use without physical distortion or damage. For example, when used as a protective and decorative coating on the exterior surfaces of an automobile, the sheet material may be subjected to relatively high temperatures when the automobile is parked outdoors on a hot, sunny day.

EXAMPLES

The following examples further illustrate the invention.

EXAMPLE 1

A support sheet was prepared from a blend described in U.S. Pat. No. 4,582,876 as follows.

A mixture of 55:45% by weight of polyester (1) and Dylark ® Styrene Copolymer 600 was compounded by extrusion. Polyester (1) was derived from terephthalic acid, 19 mole % ethylene glycol and 81 mole % 1,4-cyclohexanedimethanol. Dylark ® Styrene Copolymer 600 is a rubber modified styrene-maleic anhydride copolymer available from ARCO Chemical Company, a division of Atlantic Richfield Company.

The blend was heated to 260-290° C. and extruded through a die into a nip comprising two temperature controlled chrome plated stainless steel rollers. The extruded web was then cooled on a chill roller. The thermoplastic support had a mean thickness of about 0.20 millimeters and a maximum thickness deviation of less than 0.02 millimeters.

The support sheet prepared as described above was provided with a tie-layer comprising a polymer derived from acrylonitrile, vinylidene chloride and acrylic acid (mole ratio 15:65:20) as the adhesion promoting species. A coating composition comprising the polymer at 1½% solids in MEK at room temperature was extrusion coated through a 0.13 millimeter slot and dried at 40-90° C. to a coverage of 215 $mg/m^2$.

The composition of Table 1 below was metered from a nitrogen gas pressurized vessel through an extrusion slot having a width of 0.25 millimeter onto the support prepared and treated as described above at a speed of 8 $m$/min. The coating was dried at 40-90° C. (dry coverage 43 $gm/m^2$). The coating roll was cooled with recirculating water to reduce the propensity of the coating to streak and to minimize precipitate formation on the hopper lip. The coating method and apparatus is described in U.S. Pat. No. 2,681,294 and included means for maintaining a pressure differential across opposite surfaces of the coating ribbon.

TABLE 1

| Ingredient | Approximate % Weight |
| --- | --- |
| Deionized water | 50 |
| Urethane resin | 25 |
| Aluminum paste | 5 |
| Ethylene Glycol Monohexyl Ether | 5 |
| N-Methylpyrrolidone | 5 |
| Diethylene Glycol Monobutyl Ether | 1 |
| N,N-Dimethyl Ethanolamine | 1 |
| Xylene | 1 |
| Aliphatic Solvent Naphtha | 1 |
| Isopropyl Alcohol | <1 |

Thereafter, the protective and decorative layer thus formed was provided with a clear layer thereover comprising components A and B identified in TABLE 2 below.

TABLE 2

| | Ingredient | Approximate % Weight |
| --- | --- | --- |
| A | Urethane Resin | 60 |
| | Toluene | 30 |
| | 2-Butoxy Ethyl Acetate | 10 |
| | Benzotriazole | 1 |
| *B | Polyfunctional aliphatic isocyanurate resin based on 1,6-hexamethylene diisocyanate | 100 |

*Available as Desmodur N-3000 from Mobay Corporation Coatings Division.

Composition A diluted to 58% solids with toluene and composition B diluted to 85% solids with acetone were mixed and coated onto the light-reflecting layer at 4 $m$/min and dried at 40-90° C. for 6 minutes to form a clear topcoat having a thickness of 0.06 millimeters. The dry coverage of composition A was 51 $gm/m^2$. The dry coverage of composition B was 13 $gm/m^2$.

The sheet material thus prepared exhibited a high level of uniformity of layer thickness, an ability to undergo substantial elongation, and a high degree of resistance to flexural cracking. Moreover, the material exhibited a uniform optical density, excellent gloss, surface smoothness and distinctness of image, and an unusually high degree of geometric metamerism. Further, the material could be elongated 150% by application of heat and simultaneously stretched while achieving a defect-free coating of uniformly attractive appearance.

EXAMPLES 2-4

Use of Other Paint Compositions

Example 1 was substantially repeated except that the protective and decorative layer was formed from the composition of Table 3 below.

TABLE 3

| Ingredient | Approximate % Weight |
| --- | --- |
| Deionized water | 55 |
| Urethane resin | 20 |
| Ethylene Glycol Monohexyl Ether | 5 |
| N-Methylpyrrolidone | 5 |
| Diethylene Glycol Monobutyl Ether | 1 |
| N,N-Dimethyl Ethanolamine | 1 |
| Titanium Dioxide/Mica | <1 |
| Silica | <1 |
| Carbon Black | <1 |
| Isopropyl Alcohol | <1 |

The sheet material exhibited a substantially uniform quality appearance which was an acceptable exterior automotive finish. A non-metallic black paint composition (43 $g^m/m^2$) and a white paint composition (64 $g^m/m^2$) yielded acceptable results.

EXAMPLES 5-8

Use of Different Tie-Layer Composition

Examples 1-4 were repeated expect that the tie-layer composition described in Table 4 was employed. The composition of Table 4 (17% solids) was diluted to 5% solids with water and coated to a dry coverage of 0.54 $g^m/m^2$ (dry thickness 0.0005-0.0010 millimeters). The appearances of Examples 5-8 with this tie-layer were similar to Examples 1-4, respectively.

TABLE 4

| Ingredient | Approximate % Weight |
| --- | --- |
| Deionized water | 75 |
| Acrylic Resin | 10 |
| Urethane resin | 10 |
| N-Methylpyrrolidone | 1 |
| Diethylene Glycol Monobutyl Ether | 1 |
| Ethylene Glycol Monohexyl Ether | <1 |
| N,N-Dimethyl Ethanolamine | <1 |
| FC 170 Surfactant, sold by 3M Co. | ~0.05 |

It will be appreciated, from the foregoing detailed description and working examples, that by reason of the physical parameters of the novel sheet material described herein, the many problems inherent in providing high quality decorative and protective coatings on shaped three-dimensional substrates have been solved in an efficient and effective manner which readily lends itself to high volume low cost commercial operation.

The invention has been described in detail with particular reference to preferred embodiments thereof, but it will be understood that variations and modifications can be effected within the spirit and scope of the invention.

What is claimed is:

1. A process for the manufacture of a flexible and stretchable sheet material adapted for use in a thermoforming process in which it is stretched to conform to a three-dimensional substrate and bonded thereto so as to form a smooth and wrinkle-free protective and decorative coating thereon, said process comprising the steps of:
   (1) providing a thin, essentially planar, stretchable, thermoplastic polymeric support of substantially uniform thickness;
   (2) providing a fluid paint composition comprising a film-forming binder and a colorant;
   (3) forming a laminar flow of said paint composition and directing said flow into contact with the surface of said thermoplastic polymeric support to form thereon a thin paint layer of substantially uniform thickness; and
   (4) converting said paint layer to a dry and tack-free state.

2. The process of claim 1 wherein said laminar flow is formed by extruding said composition through a slot.

3. A process according to claim 1, wherein said paint layer has an outer surface and contains generally flat light reflecting particles having a preferred orientation within 12 degrees of parallelism with said outer surface, and at least 75% of said particles being in the preferred orientation.

4. A process according to claim 3, wherein substantially none of the particles have an orientation greater than about 50° of parallelism.

5. A process according to claim 1 further comprising: providing an adhesion promoting layer between said support and said paint layer.

6. A process according to claim 5, wherein said paint layer is at least 8 times the thickness of said adhesion promoting layer.

7. A process according to claim 5, wherein said adhesion promoting layer has a thickness not greater than about 0.0025 millimeters.

8. A process according to claim 1 further comprising: providing a substantially clear layer adhered to said paint layer.

9. A process according to claim 8, wherein said clear layer has a thickness substantially greater than said paint layer.

10. A process according to claim 1, wherein said paint layer provides a distinctness of image of at least 80.

11. A process according to claim 1, wherein said paint layer has a 20° gloss of at least 80.

12. A process according to claim 1 further comprising: providing a pressure sensitive adhesive layer on the opposite side of said support sheet from said paint layer.

13. A process according to claim 1, wherein said support has a mean thickness ranging from 0.05 to 0.40 millimeters.

14. A process according to claim 13, wherein said support has a maximum thickness deviation from its mean thickness of less than 20%.

15. A process according to claim 1, wherein said paint layer has a mean thickness ranging from 0.012 to 0.080 millimeters.

16. A process according to claim 1, wherein said sheet material has a thickness ratio for said paint layer to said support which ranges from 1.00 to 0.04.

17. A process according to claim 1, wherein said sheet material has an optical density of at least 3.

18. A process according to claim 17, wherein said sheet material has maximum optical density variation of less than 0.3.

19. A process according to claim 1, wherein said sheet material has an average surface roughness of less than 0.4 microns.

20. A process according to claim 1 further comprising: providing a substrate to which said support of said sheet material is bonded.

* * * * *